US008187707B2

(12) United States Patent
Van Benthem et al.

(10) Patent No.: US 8,187,707 B2
(45) Date of Patent: May 29, 2012

(54) HYDROPHOBIC COATING

(75) Inventors: Rudolfus Antonius Theodorus Maria Van Benthem, Limbricht (NL); Di Wu, Eindhoven (NL); Weihua Ming, Eindhoven (NL); Gijsbertus De With, Valkenswaard (NL)

(73) Assignee: DSM IP Assets B.V., Heerlen (NL)

( * ) Notice: Subject to any disclaimer, the term of this patent is extended or adjusted under 35 U.S.C. 154(b) by 684 days.

(21) Appl. No.: 11/920,873

(22) PCT Filed: May 22, 2006

(86) PCT No.: PCT/EP2006/004837
§ 371 (c)(1),
(2), (4) Date: Sep. 3, 2008

(87) PCT Pub. No.: WO2006/125589
PCT Pub. Date: Nov. 30, 2006

(65) Prior Publication Data
US 2009/0104347 A1    Apr. 23, 2009

(30) Foreign Application Priority Data

May 25, 2005    (EP) ................................ 05076221

(51) Int. Cl.
*B32B 5/00*    (2006.01)
*B32B 5/16*    (2006.01)
*B32B 7/02*    (2006.01)
(52) U.S. Cl. ........ 428/403; 428/402; 428/212; 428/323; 427/372.2
(58) Field of Classification Search .................. 428/403
See application file for complete search history.

(56) References Cited

U.S. PATENT DOCUMENTS

| | | | | |
|---|---|---|---|---|
| 3,287,303 | A | * | 11/1966 | Wagner .................... 523/404 |
| 5,356,617 | A | * | 10/1994 | Schlossman ................ 424/63 |
| 6,030,662 | A | | 2/2000 | Minamizaki |
| 6,103,379 | A | * | 8/2000 | Margel et al. .............. 428/403 |
| 6,117,543 | A | * | 9/2000 | Zaima et al. ............... 428/332 |
| 6,599,631 | B2 | * | 7/2003 | Kambe et al. ............. 428/447 |
| 7,332,351 | B2 | * | 2/2008 | Tan et al. .................. 436/524 |
| 2003/0207129 | A1 | | 11/2003 | Kambe et al. |
| 2006/0203205 | A1 | | 9/2006 | Inamoto et al. |
| 2006/0263516 | A1 | * | 11/2006 | Jones et al. ............... 427/180 |

(Continued)

FOREIGN PATENT DOCUMENTS

EP    0 950 694    10/1999

(Continued)

OTHER PUBLICATIONS

International Search Report for PCT/EP2006/004837 mailed Aug. 25, 2006.

(Continued)

*Primary Examiner* — Alicia Chevalier
*Assistant Examiner* — Alexandre Ferre
(74) *Attorney, Agent, or Firm* — Nixon & Vanderhye P.C.

(57) ABSTRACT

Hydrophobic film or coating, comprising primary particles, secondary particles, adhering to the surface of the primary particles and having an average diameter that is smaller than the average diameter of the primary particles, and a hydrophobic layer covering at least partly the surface of the secondary particles and adhering to that surface, characterized in that the secondary particles are adhering to the surface of the primary particles by covalent chemical bonds.

11 Claims, 2 Drawing Sheets

TEM photos of raspberry silica particles.

U.S. PATENT DOCUMENTS

2006/0286305 A1    12/2006    Thies et al.

FOREIGN PATENT DOCUMENTS

| JP | 11-50265 | 2/1999 |
| JP | 2005-89725 | 4/2005 |
| JP | 2007-501891 | 2/2007 |

OTHER PUBLICATIONS

Written Opinion of the International Searching Authority dated Aug. 25, 2006.

Japanese Office Action with translation dated Jan. 11, 2012.

* cited by examiner

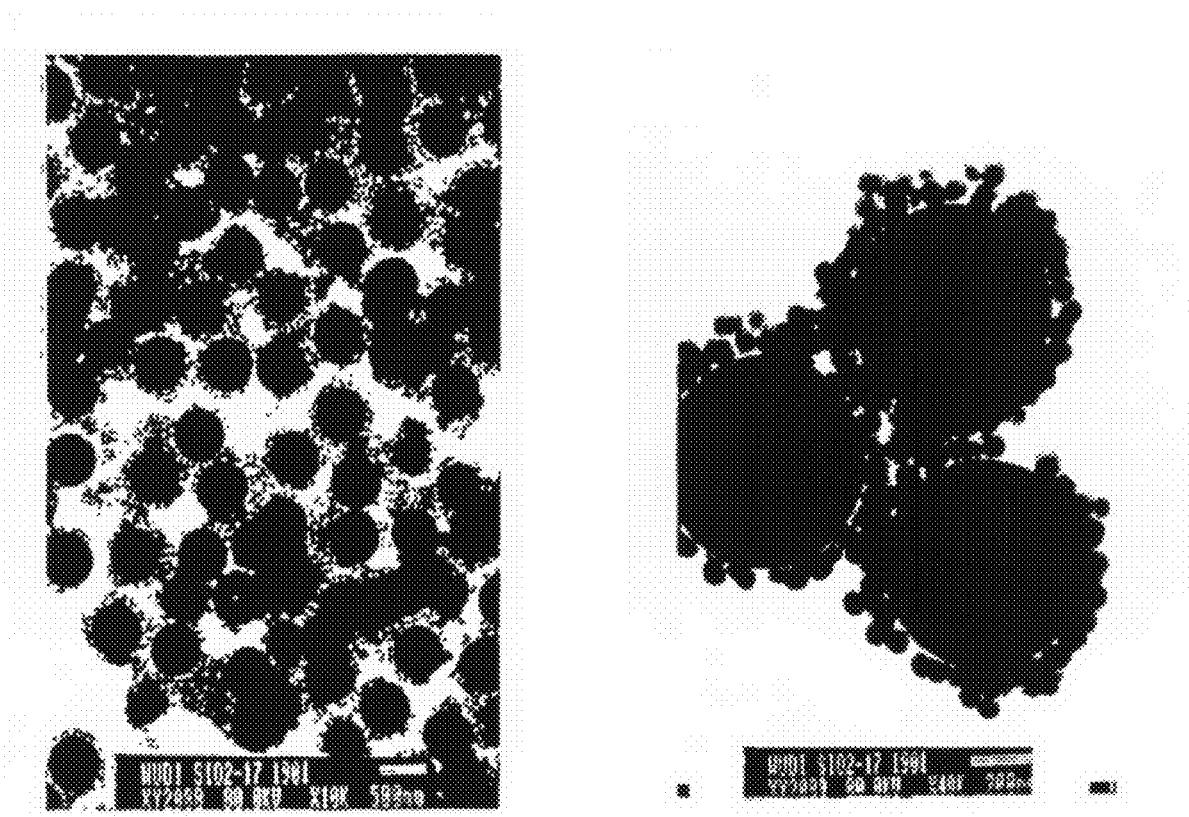
Figure 1. TEM photos of raspberry silica particles.

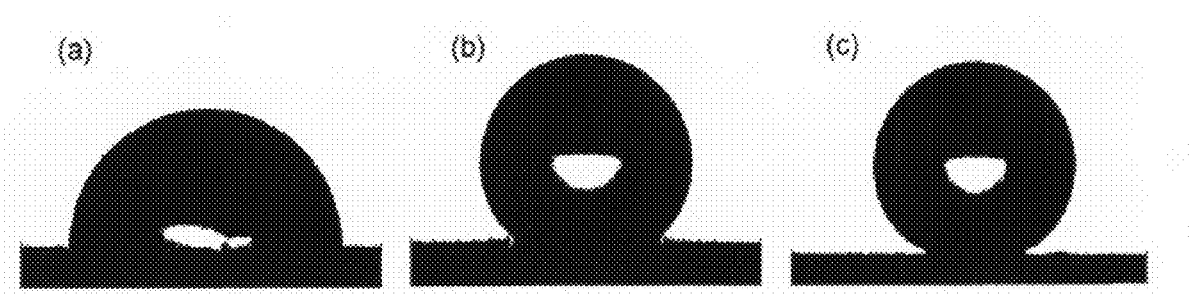
Figure 2. Water droplets of 5 µL on films containing (a) no particles (comparative experiment A), (b) primary particles (comparative experiment B), and (c) raspberry particles according to the invention.

HYDROPHOBIC COATING

This application is the U.S. national phase of International Application No. PCT/EP2006/004837, filed 22 May 2006, which designated the U.S. and claims priority to European Patent Application No. 05076221.0, filed 25 May 2005, the entire contents of each of which are hereby incorporated by reference

FIELD

The invention relates to a coating, a kit of parts for producing the coating and a process for the application of the coating. Preferably the coating according to the invention is a hydrophobic coating, which coating even may be super-hydrophobic.

BACKGROUND AND SUMMARY

Hydrophobic coatings are becoming increasingly popular in numerous applications, such as windows, TV screens, DVD disks, cooking utensils, clothing, medical instruments etc because they are easy to clean and have low adhesive properties. Generally, a hydrophobic material or coating is characterised by a static contact angle of water ($\theta$) of 90° or above. Hydrophobic polymeric materials such as poly(tetrafluorethene) (PTFE) or polypropylene (PP) have been available for decades. These materials suffer from a limited hydrophobicity, as well as inferior mechanical properties as compared to engineering materials or highly crosslinked coatings. For instance, PP has a static contact angle of water of roughly 100° whereas PTFE, which is amongst the most hydrophobic polymeric material known, has a static contact angle of water of roughly 112°.

Some hydrophobic coatings are being referred to in the art as super-hydrophobic coatings. Super-hydrophobic coatings are generally defined by a static water contact angle above 140°.

Surfaces with super-hydrophobic properties are found in nature, for example the lotus leaf or cabbage leaf. The waxes secreted onto the leaf's rough surface reduce the adhesion of water and contaminating particles to the leaf. Water droplets deposited on the leaf simply roll off, gathering dirt particles and cleaning the leaf in the process.

An enhanced hydrophobicity of coatings has been obtained via inclusion of micron-sized spherical particles in a silicone-based paint or polyolefin-based spray (BASF Press release Oct. 28, 2002, P345e, Dr Karin Elbl-Weiser, Lotusan, Nature news service/Macmillan Magazines Ltd 2002). These suspensions are applied as paint or from a spray, yet suffer from a lack in mechanical robustness. The abrasion resistance of such coatings is low and thus the coatings need to be reapplied after a short period of time to maintain the hydrophobic functionality of the surface. Additionally, the coating scatters light in the visible range, this effectively results in an opaque and optically non-transparent coating.

In U.S. Pat. No. 6,068,911, Hitachi described super-hydrophobic coatings based also on the principle of surface roughness prepared via UV curing of resins containing non-reactive nano-particles and fluoropolymers. Their coating formulation consists of at least two solvents, evaporation of the most volatile solvent drives the fluoropolymer to the surface, making it hydrophobic. The presence of the inert non-reactive nano-particles results in surface roughness and the overall coating exhibits superhydrophobicity. As this technology is based on the evaporation of an organic solvent to create surface roughness during processing, kinetics will play a role in this process. Also, the hardness, durability and abrasion resistance of the coating, leaves better performance to be desired.

Another approach is to use a non-abrasion-resistant layer that is continuously replenished from a reservoir of mobile fluor-containing agents in an immobile matrix layer with on lop a vapour-deposited top layer of inorganic material which has a large degree of roughness and cracks (WO 01/92179). The concept is that the fluoropolymers diffuse through the inorganic layer and cover the surface, thus forming a regenerative surface layer. This results in hard, optically clear surfaces with a high water contact angle and very low roll-off angle. However, the production of such complex structures via vapour deposition is very time-consuming and laborious, and the area size that can be coated is limited. Also, the release and washing away of the mobile fluoropolymers is environmentally not desirable.

One object of the invention is to provide a superhydrophobic coating having a static contact angle greater than 140° that is easy to produce, has reproducible quality, and which has very good mechanical properties.

Surprisingly this object is achieved by a superhydrophobic film or coating, comprising,
  a) primary particles,
  b) secondary particles adhering to the surface of the primary particles and having an average diameter that is smaller than the average diameter of the primary particles,
  c) a hydrophobic upper surface layer covering at least partly the surface of the secondary particles and adhered to that surface,
wherein the secondary particles are adhered to the surface of the primary particles by covalent chemical bonds.

An advantage of the coating according to the invention is that it is possible to produce the coating according to the invention with a well-defined and constant quality.

A further advantage of the coating according to the invention is that the coating is highly wear resistant and/or scratch resistant.

Yet a further advantage of the coating according to the invention is that the coating according to the invention is easy to produce.

Yet a further advantage of the coating according to the invention is that it is possible that the coating does not comprise any fluoro atoms.

Instead of using a hydrophobic upper surface layer on top of the layer comprising the raspberry particles, it is also possible to use different kind of upper surface layers, for example a hydrophilic layer, a layer having absorbing properties, for example for absorbing a smell or spreading a fragrance, having a catalytic activity, for example for oxidatively eliminating air pollutants, etc. It is even possible that the layer adhering to the surface of the secondary particles is not present at all.

BRIEF DESCRIPTION OF DRAWING FIGURES

FIG. 1 shows TEM photos of raspberry silica particles; and
FIG. 2 shows water droplets of 5 µL on films containing (a) no particles comparative experiment A), (b) primary particles (comparative experiment B), and (c) raspberry particles according to the invention.

DETAILED DESCRIPTION

A new and unique coating or film is obtained in this way, having a wide variety of possibilities, because of its specific structure and the covalent chemical bonds between the primary and secondary particles. One of the advantages of the coating or film is that due to the structure of the raspberry particles a coating is obtained having a high specific surface area. Therefore the invention also relates to a coating or film comprising a) primary particles,
b) secondary particles adhering to the surface of the primary particles and having an average diameter that is smaller than the average diameter of the primary particles, wherein the secondary particles are adhering to the surface of the primary particles by covalent chemical bonds.

Preferably the coating or film also comprises an upper surface layer covering at least partly the surface of the secondary particles and adhering to that surface. The upper surface layer is the layer that is finally applied and forms the surface of the coating. Preferably the thickness of the upper surface layer is that small, that the structure of the particles is at least partly still observable at the upper surface of the coating. More preferable the upper surface layer has a thickness of about equal to 3 times the average diameter of the primary particles or below, more preferably the layer has a thickness equal to the average diameter of the primary particles or below. Most preferably the layer has a thickness of equal to 0.5 times the average diameter if the primary particles or below. The thickness preferably is above 1 nanometer, more preferably above 2 nanometer.

Preferably the upper surface layer is adhered to the surface of the secondary particles by covalent chemical bonds as well. This further improves the mechanical properties of the coating according to the invention.

More preferably the primary particles or the secondary particles are adhering to a substrate by covalent chemical bonds. In this way a coating is obtained having a further improved level of scratch resistance and a high level of adhesion to the substrate.

Most preferably the primary particles or the secondary particles are adhering to a supporting layer by covalent chemical bonds. For example if the substrate does not comprise reactive functionalities capable of forming covalent chemical bonds with the particles, the substrate may be covered with the supporting layer.

Good results are obtained if the average diameter of the secondary particles is at least 5 times smaller than the average diameter of the primary particles. This results in a high static contact angle and a low roll-off angle for water, so providing improved self cleaning properties.

Preferably the average diameter of the secondary particles is 8 times smaller, more preferably 10 times smaller, still more preferably 20 times smaller, yet still more preferably 40 times smaller than the average diameter of the primary particles.

The average diameter of the primary particles may be in a range of between 0.1 and 20 μm. Preferably the average diameter of the primary particles is in a range between 0.5 and 10 μm, more preferably between 0.6 and 5 μm, most preferably between 0.6 and 3 μm. In this way favorable self cleaning properties are obtained.

The average diameter of the secondary particles may be in a range between 5 and 1000 nm. Preferably the average diameter of the secondary particles is in a range between 10-500 nm, more preferably between 30-300, most preferably between 40 and 60 nm. In this way transparent coatings may be obtained.

If a transparent coating is desired good results are obtained if the average diameter of the primary particles is smaller than 300 nm.

Most preferably the average diameter of the primary particles is in a range between 0.3 and 3 μm and the average diameter of the secondary particles is in a range between 10 and 100 nm.

Methods for determining the particle dimension include transmission electron microscopy (TEM), scanning electron microscopy (SEM), atomic force microscopy (AFM) imaging.

For measuring the dimensions of the particles the particles are in a very dilute mixture applied on a surface in a thin layer, so that at a TEM photographic image of the layer, the single particles are observable. Then from 100 particles, as randomly selected, the dimensions are determined and the average value is taken. In case the particles are not spherical for the diameter the longest straight line that can be drawn from one side of the particle to the other side is taken.

Preferably the particles have an aspect ratio below 2, preferably below 1.5, more preferably below 1.2, most preferably below 1.1. The aspect ratio is the ratio between d1, the longest straight line that can be drawn from one side of the particle to the other side, and d2, the shortest straight line that can be drawn from one side to the other side of the particle.

Preferably at least 80% of the particles have a diameter that has a value between 50% and 200% of the average diameter.

The primary particles and the secondary particles may be either organic or inorganic particles. Examples of organic are carbon nano-spheres. Preferably, the primary particles and the secondary particles are inorganic particles. Suitable inorganic particles are for example oxide particles. Preferred oxide particles are particles of an oxide selected from the group of aluminium oxide, silicium oxide, zirconium oxide, titanium oxide, antimony oxide, zinc oxide, tin oxide, Indium oxide, and cerium oxide. It is also possible to use a mixture of particles from different oxides or to use particles of mixed oxides. Most preferably, the particles are particles of silicium oxide.

Good results are obtained if the covalent chemical bonds adhering the secondary particles to the surface of the primary particles are formed by the reaction between a reactive functionality I at the surface of the primary particles and a reactive functionality II at the surface of the secondary particles, the reactive functionality I being complementary with the reactive functionality II. This means that the first reactive functionality will react with the second reactive functionality, but that first and second reactive functionalities will not react among themselves. This causes the secondary particles to adhere to the primary particles, without primary particles adhering to primary particles and secondary particles adhering to secondary particles. In this way a so-called raspberry structure is provided wherein the secondary particles are covering substantially the surface of the primary particles in a mono-layer. The raspberry structure is very favorable for obtaining self-cleaning properties.

It is also desirable that the covalent chemical bonds adhering the upper surface layer to the surface of the secondary particles are formed by the reaction between a reactive functionality II at the surface of the secondary particles and a reactive functionality I or III in the hydrophobic layer, the reactive functionality II being complementary to the reactive functionality I and III.

It is also desirable that the covalent chemical bonds that adhere the secondary particles to the supporting layer are formed by the reaction between a reactive functionality II at the surface of the secondary particles and complimentary reactive functionalities I or III or IV in the supporting layer.

Examples of pairs of reactive functionalities and the corresponding complementary reactive functionalities suitable to be used in the coating of the present invention for forming the covalent chemical bonds are constituted by the group comprising acid and epoxy, amine and epoxy, hydroxyl and epoxy, silanol and epoxy, thiol and epoxy, thiol and isocyanate, hydroxyl and isocyanate, amine and isocyanate, acid and aziridine, acid and carbodiimide, amine and keton, amine and aldehyde.

Very good results are obtained if epoxy and amine functionalities are used for the formation of the covalent chemical bonds.

As the hydrophobic upper surface layer, a layer may be used comprising a compound, a polymer or a cured polymeric material comprising fluoro atoms, at least a fraction of the compound, the polymer or the cured polymeric material being bonded to the secondary particles by covalent chemical bonds. For examples these are compounds, polymers or cured polymeric materials comprise —$CF_2$— or —$CF_3$ groups.

Examples of compounds include 2-perfluorooctyl-ethanol, 2-perfluorohexyl-ethanol, 2-perfluorooctyl-ethane amine, 2-perfluorohexyl-ethane amine, 2-perfluorooctyl-ethanoic acid, 2-perfluorohexyl-ethanoic acid, 3-perfluorooctyl-propenoxide, 3-perfluorohexyl-propenoxide.

Examples of polymers include perfluoropolyether (PFP).

Preferably as the hydrophobic upper surface layer a layer may be used comprising a polymer which polymer comprises silane or siloxane monomeric units, at least a fraction of the polymer being bonded to the secondary particles by covalent chemical bonds. In this way the obtained coating is very scratch resistant and is also very well resistant to weathering. Examples of such monomeric units include dimethoxysiloxane, ethoxysiloxane, methyloctylsiloxane, methylvinylsiloxane, trimethylsiloxane, dimethylsiloxane, methylphenylsiloxane, diethylsiloxane, trifluoropropylmethylsiloxane, methylphenylsilane.

Examples of polymers include polydimethylsiloxane which endgroups are functionalized with a functional reactive group, preferably an epoxy or an amine group, such as for example mono(3-aminopropyl)-polydimethylsiloxane, mono-3-glycidoxypropyl-)polydimethylsiloxane, bis(3-aminopropyl)-polydimethylsiloxane and bis-3-glycidoxypropyl-)polydimethylsiloxane.

The skilled person knows how to produce the primary and secondary particles and how to provide the surface of such particles with reactive functionalities, suitable for the formation of the covalent chemical bonds. A process very suitable for the production of the primary and the secondary particles for the coating according to the present invention is disclosed in Stöber et all. J. Coll. Interface Sci. 1968, 26, p. 62 etc. The process includes dissolving tertra-alkoxy silane in a suitable solvent, such as for example ethanol, and than reacting the silane with water in the presence of a catalyst while stirring to form the particles.

After that the reactive functionalities are applied to the particles by reacting the particles with for example functional organosiloxanes, for example 3-glycidoxypropyl- or 3-aminopropyl-trialkoxysilanes. Preferably 3-glycidoxypropyltrimethoxysilane or 3-aminopropyltriethoxysilane are used for this purpose.

The particles are dispersed in water, ethanol or in a water/ethanol mixture, optionally with the aid of charge control agents, such as for example acids, bases or surfactants, to form a composition suitable for the application of the layer comprising the particles. This composition preferably comprises no or only a limited amount of further solid components, the amount being so limited that the particles are not or only partly embedded in such components, once the coating according to the invention is produced.

The invention also relates to a kit of parts comprising:
1) a coating composition comprising the primary particles,
2) a composition comprising the secondary particles,
3) a composition for the hydrophobic upper surface layer, comprising a hydrophobic compound or polymer.

The invention also relates to a kit of parts comprising:
1) a composition comprising the primary particles, having been reacted with secondary particles, so that their surface is covered with secondary particles.
2) a composition for the hydrophobic layer, comprising a hydrophobic compound or polymer.

The invention also relates to a kit of parts for producing a film or coating according to the invention, including the supporting layer, comprising:
1) a composition comprising the primary particles, having been reacted with secondary particles, so that their surface is covered with secondary particles.
2) a composition for the supporting layer, comprising a compound being capable of forming a covalent chemical bond with the primary or the secondary particle.

The invention also relates to a process for the application of the coating according to the invention.

In one embodiment this process comprises the steps of
1) Application of a composition comprising the primary particles on top of a substrate or a supporting layer and curing, if appropriate at elevated temperature to have the particles to react with the supporting layer.
2) Application of a composition comprising the secondary particles on top of the primary particles and curing, if appropriate at elevated temperature, to adhere the secondary particles to the primary particles.
3) Application of a coating composition for the upper surface layer and curing, if appropriate at elevated temperature, to adhere the upper surface layer to the secondary particles.

The application in step 1-3 may be carried out by a method known to the skilled person for applying a coating composition, for example spin coating, spraying or rolling. After steps 1 and 2 loose particles may eventually be rinsed away by means of a liquid, for example water or a solvent, or may be removed mechanically, for example by sonification.

In a preferred embodiment the process for application of the coating according to the invention comprises the steps of
1) Application of a composition comprising the primary particles, having been reacted with secondary particles, so that their surface is covered with secondary particles (raspberry particles) on top of a substrate or a supporting layer and curing, if appropriate at elevated temperature to have the secondary particles to react with the supporting layer.
2) Application of a coating composition for the upper surface layer and curing, if appropriate at elevated temperature, to adhere the upper surface layer to the secondary particles.

It is very favorable to use the raspberry particles, that have been prepared before, directly in the coating process, as in this way the coating process is speeded up.

The application in step 1 and 2 may be carried out by a method known to the skilled person for applying a coating composition, for example spin coating, spraying or rolling. After step 1 loose particles may eventually be removed by rinsing or mechanical, for example by sonification.

The supporting layer may comprise the usual additives for a coating, such as for example pigments and fillers.

The supporting layer is preferably formed from a resin mixture comprising two components with complimentary reactive functionalities. The supporting layer itself is yet uncured, partly cured or fully cured. Preferably there is an excess of one of the components, so that the reactive functionality of that components still is available after the formation of the supporting layer for reaction with the functionality at the surface of the primary or the secondary particles. Most preferably the supporting layer is partly cured before step 1 and fully cured after that.

The formation of the covalent chemical bonds between the primary and secondary particles also called the curing reaction, between the secondary particles and the supporting layer and the upper surface layer or the covalent chemical bonds in the supporting layer may for instance take place at temperatures between 10 and 250° C., preferably between 20 and 200° C., in a period of between for instance 2 minutes to several hours. This depends for instance from the reactive functionalities and complementary reactive functionalities chosen. The skilled person is very well able to choose these reaction conditions.

As a self-cleaning coating the coating is very suitable for application as an architectural coating.

EXAMPLES

The invention is further explained in the examples, without being restricted to that.
Materials Used in the Examples
TEOS: Tetraethoxysilane, obtained from ABCR.
DMS-A15: aminopropyl terminated polydimethylsiloxane, obtained from ABCR.
TPGE: trimethylolpropane triglycidyl ether (TPTGE), obtained from Aldrich.
GPS: 3-glycidoxypropyl trimethoxysilane (98% purity), obtained from Aldrich
APS: 3-aminopropyltriethoxysilane (98% purity), from Aldrich;
DMSE21: epoxypropoxypropyl terminated polydimethylsiloxane, obtained from Gelest Inc.
Jeffamine D-230: polyoxypropylene diamine, amine-hydrogen equivalent weight=60, obtained from Huntsman.
Ammonia solution (25%) was purchase from Merk. All of these chemicals were used without further purification.
Measurements
Transmission electron microscopy (TEM). TEM experiments were performed with a JEOL JEM-2000FX TEM at 80 KV. Traditional negative plates were used for the data recording. The negative were digitized using a scanner (Agfa DUO Scanner) working in grade mode with 8-bits/channel of grayscale. The samples were prepared by dispersing silica particles in ethanol and depositing one drop of the dilute suspension on a copper grid coated with a carbon membrane.

Contact angle measurement. Contact angles and roll-off angles were measured with deionized water on a Dataphysics OCA 30 instrument at room temperature (~21° C.). All the contact angles and roll-off angles were determined by averaging values measured at three different points on each sample surface. Dynamic advancing and receding angles were recorded while the probe liquid was added to and withdrawn from the drop, respectively.
Preparation of Amino-Functionalized Secondary Silica Nanoparticles First, monodispersed silica particles of about 70 nm in diameter were prepared by polymerization of TEOS, according to the Stöber method (disclosed in Stöber et all. J. Coll. Interface Sci. 1968, 26, p. 62 etc.). Briefly, 6 mL of TEOS was added dropwise, under magnetic stirring, to a flask containing 15 mL of ammonia solution (25%, catalyst) and 200 mL of ethanol. The reaction was carried out at 60° C. for 5 h, followed by the addition of 0.3 mL of APS in 5 mL of ethanol. The stirring was continued for 12 h under $N_2$ atmosphere at 60° C. The secondary nanoparticles were separated by centrifugation and the supernatant was discarded. The particles were then washed by ethanol three times. The white powders were vacuum-dried at 50° C. for 16 h.

The existence of amine groups at the perimeter of secondary silica nanoparticles was examined by ninhydrin test. The amino-functionalized secondary silica particles were added into 5% ninhydrin aqueous solution at room temperature. The color of the particles turned from white to blue within a few min, indicating the successful grating of amine moieties on the silica particle surface.
Preparation of Epoxy-Functionalized Primary Silica Microparticles Bare silica particles of 700 nm in diameter were synthesized first. At room temperature, 10 mL of TEOS was added dropwise, under magnetic stirring, to a flask containing 21 mL of ammonia solution, 75 mL of isopropanol, and 25 mL of methanol. After 5 h, the particles were separated by centrifugation, washed with distilled water/ethanol, and dried in vacuum-dried at 50° C. for 16 h. Then 1.5 g of silica microparticles were redispersed into 40 mL of dry toluene, and 0.2 g of GPS in 5 mL dry toluene was added dropwise to the silica suspension with vigorous stirring. The suspension was stirred at 50° C. under $N_2$ atmosphere for 24 h. The primary particles were then separated by centrifugation and washed with toluene three times. The washed powders were vacuum-dried at 50° C. for 16 h.
Preparation of Raspberry Amino-Functionalized Silica Particles (Primary Particles Having their Surface Covered with the Secondary Particles):

Amino-functionalized secondary silica nanoparticles (0.4 g) of were suspended in 20 mL of ethanol, and 0.6 g of epoxy-functionalized primary silica microparticles were suspended in 15 mL of ethanol, respectively. Afterwards, the primary silica microparticle suspension was added dropwise, under vigorous stirring, into the secondary silica nanoparticle suspension. The suspension was refluxed for 24 h under $N_2$ atmosphere. The particles were then separated by centrifugation and washed with ethanol. The powders were vacuum-dried at 50° C. for 16 h. The result was the raspberry structured particles as shown by the TEM photographs in FIG. 1.
Preparation of Epoxy-Amine Coatings with Dual-Size Surface Roughness First, a supporting layer of epoxy-amine with the epoxy in 10% excess was prepared on aluminum substrates by the following procedure: 0.44 g of TPTGE and 0.24 g of Jeffamine D-230 were dissolved in 1 mL of toluene, with an epoxy/amino molar ratio of about 2.2:1. Afterwards, a film of about 30 μm (wet film thickness) was drawn down on an aluminum panel with an automatic film applicator and then cured at 75° C. for 2 h. Next, 0.05 g of raspberry amino-functionalized silica particles was suspended in 1 mL ethanol. The suspension was deposited on the first epoxy layer by an automatic film applicator (wet film thickness of about 60 μm) and then kept at 75° C. for 18 h. After cooling down, the film was flushed with ethanol in a sonicator to remove loose particles, and dried at room temperature.

Example I

The superhydrobhobic film according to the invention was obtained by grafting PDMS onto the double-structured film containing the raspberry particles. The surface-roughened film was first reacted with amine-end-capped DMS-A15 at 80° C. for 4 h to ensure that any remaining epoxy groups from either epoxy-amine film or large silica particles were converted into terminal amine groups; after the reaction the film was thoroughly washed by toluene to remove unreacted DMS-15. In the end, the film was reacted with epoxy-end-capped DMS-E21 at 80° C. for 4 h and followed by washing with toluene, resulting in a layer of PDMS covering the roughened surface.

Comparative Experiment A

A smooth epoxy-amine film, surface modified with PDMS, not comprising any particles was prepared on an aluminum substrate by the following procedure: 0.44 g of TPTGE and 0.24 g of Jeffamine D-230 were dissolved in 1 mL of toluene, with an epoxy/amino molar ratio of about 2.2:1. Afterwards, a film of about 30 μm (wet film thickness) was drawn down on an aluminum panel with an automatic film applicator and then cured at 75° C. for 2 h. Finally an amino-PDMS (DMS-A15) was grafted to the film.

Comparative Experiment B

For comparative purpose, a film containing only primary silica particles was prepared as follows (reaction conditions are the same with above). An epoxy-amine film was prepared with 10% amine in excess according to the procedure outlined in comparative experiment A, followed by the surface grafting of the primary silica particles, prepared according to the procedure as outlined above (containing epoxy groups at surface). Loose primary particles were removed by flushing with ethanol in a sonicator. Finally an amino-PDMS (DMS-A15) was grafted to the film.

The wettability of a film is reflected by the contact angle (CA) of water on the surface. The advancing water CA on the smooth film, (comparative experiment A) is 92±2° (FIG. 2a), with a CA hysteresis of about 40°. For the film only comprising the primary particles, modified with PDMS (comparative experiment B), there is an increase of the water advancing CA, reaching 141±1.50 (FIG. 2b), but at the same time, the CA hysteresis also increases dramatically to about 110°. Even when the film is turned upside down, the water droplet would stay pinned to the film surface. In a sharp contrast, for the film containing the raspberry particles, surface modified with PDMS according to the invention, the advancing CA of water further increases to 168±1° (FIG. 2c); the CA hysteresis is shown to be about 4°. More importantly, the roll-off angle of a 20-μL water droplet on the surface is 5±1°.

The invention claimed is:

1. A coated substrate comprising a substrate and a superhydrophobic film or coating on the substrate, wherein the superhydrophobic film or coating has a static water contact angle above 140° and comprises:
   (1) a layer comprising raspberry particles, wherein the raspberry particles comprise,
      a) primary particles, and
      b) secondary particles, adhered to a surface of the primary particles by covalent chemical bonds and having an average diameter that is smaller than an average diameter of the primary particles, and
   (2) a hydrophobic upper surface layer covering at least partly a surface of the secondary particles and adhered to the surface of the secondary particles, the upper surface layer having a thickness of from 1 nm to three times the average diameter of the primary particles, wherein
   the primary particles or the secondary particles are adhered to the substrate by covalent chemical bonds.

2. The coated substrate according to claim 1, further comprising a supporting layer, wherein the primary particles or the secondary particles are adhered to the supporting layer by covalent chemical bonds.

3. The coated substrate according to claim 1, wherein the average diameter of the secondary particles is at least 5 times smaller than the average diameter of the primary particles.

4. The coated substrate according to claim 1, wherein the average diameter of the secondary particles is between 5 and 1000 nm.

5. The coated substrate according to claim 1, wherein the average diameter of the primary particles is between 0.3 and 20 μm.

6. The coated substrate according to claim 1, wherein the upper surface layer is adhered to the surface of the secondary particles by covalent chemical bonds.

7. The coated substrate according to claim 6, wherein the covalent chemical bonds adhering the upper surface layer to the surface of the secondary particles are formed by the reaction between a reactive functionality II at the surface of the secondary particles and a reactive functionality I or III in the hydrophobic layer, the reactive functionality II being complementary to the reactive functionality I and III.

8. The coated substrate according to claim 1, wherein the covalent chemical bonds adhering the secondary particles to the surface of the primary particles are formed by the reaction between a reactive functionality I at the surface of the primary particles and a reactive functionality II at the surface of the secondary particles, the reactive functionality I being complementary with the reactive functionality II.

9. The coated substrate according to claim 8, wherein the reactive functionality and the corresponding complementary reactive functionality are chosen out of the group comprising add and epoxy, amine and epoxy, hydroxyl and epoxy, silanol and epoxy, thiol and epoxy, thiol and isocyanate, hydroxy and isocyanate, amine and isocyanate, add and aziridine, add and carbodiimide, amine and keton, amine and aldehyde.

10. The coated substrate according to claim 9, wherein as the reactive functionality and the complementary reactive functionality comprise amine and epoxy.

11. A method of making the coated substrate according to claim 1 or 2, comprising the steps of:
   1) applying a composition comprising raspberry particles which comprise the primary particles, having been reacted with secondary particles, so that surfaces of the primary particles are covered with secondary particles on top of a substrate or a supporting layer and during, at a temperature between 10 and 250° C., to have the secondary particles react with the supporting layer, and
   2) applying a coating composition for the upper surface layer and curing, at a temperature between 10 and 250° C., to adhere the layer to the secondary particles.

* * * * *